United States Patent [19]

Mutchler

[11] 4,063,750
[45] Dec. 20, 1977

[54] COMBINATION TOWBAR AND PARKING STAND

[75] Inventor: Paul Mutchler, University City, Mo.

[73] Assignee: American Air Filter Company, Inc., Louisville, Ky.

[21] Appl. No.: 721,061

[22] Filed: Sept. 7, 1976

[51] Int. Cl.² ............................................. B60D 1/14
[52] U.S. Cl. .................................... 280/475; 280/763
[58] Field of Search ...................... 280/475, 763, 47.33

[56] References Cited

U.S. PATENT DOCUMENTS

| 2,327,308 | 8/1943 | Johnston | 280/475 |
| 2,595,100 | 4/1952 | Ravers | 280/475 |
| 2,848,241 | 8/1958 | Hubbard | 280/475 X |

FOREIGN PATENT DOCUMENTS

| 1,025,511 | 1/1953 | France | 280/475 |

Primary Examiner—Joseph F. Peters, Jr.
Assistant Examiner—John A. Pekar

[57] ABSTRACT

A trailer frame is provided with a positioning member for releasably receiving a towbar and parking stand thereto. The towbar is provided with a releasable locking device thereon for positioning the towbar in a plurality of positions. Generally, the towbar is adaptable for positioning in a towing position, an operating position, and a storage position.

9 Claims, 6 Drawing Figures

COMBINATION TOWBAR AND PARKING STAND

BACKGROUND OF THE INVENTION

This invention relates to a towing assembly for a trailer, but more particularly relates to a towing assembly for transporting a portable heater wherein the towing assembly is adaptable for use in a plurality of positions.

Portable heaters, utilized particularly by the military in cold climates for heating living quarters, airplane hangers, mess halls and the like, are generally combined with trailer frames and are transported over rough terrain for relatively long distances to the point of use. In the towing of these portable heaters, many different types of assemblies have been proposed which are attached to the portable heaters or similar type wheeled devices in order to hook onto a towing vehicle. Many assemblies have been proposed particularly in the case of two-wheeled devices, to provide a support for these two-wheeled devices in a position wherein the towed device may be stored, or in the case of a portable heater, the device may be supported in an operating position. However, one assembly which is easy and simply operable to provide a plurality of uses, such as, for example (1) means to connect to a towing vehicle; (2) means to support a towed device in a storing position; and, (3) means to support the device in an operating position, which is easily and simply constructed as well as being easily changed from one position to another, has been sought with very little success.

SUMMARY OF THE INVENTION

In the present invention, it is recognized that it is desirable to provide a towing means for a device disposed upon a trailer frame which is adaptable for positioning in a plurality of positions thereby providing a plurality of functions. Furthermore, it is recognized that it is desirable to provide a towing assembly for a trailer frame which is economical, easily constructed, and easy and quickly operable. Also, it is recognized that it is desirable to provide a towbar which yields at least a two to one mechanical advantage for raising and lowering a device to be towed.

The present invention advantageously provides a straightforward arrangement for a towing assembly for a trailer frame utilizing a towbar releasably attachable for a plurality of positions. The positions generally in which the towbar may be used include (1) a towing position; (2) a stand or storage position; as well as (3) an operating position. The trailer includes means thereon, such as a portable heater, so that a door or other mechanism on the trailer may be opened when used in an operating position. Furthermore, the present invention includes a towbar which in a towing position includes a skid bar on the underside thereof so that if the towbar becomes disconnected from the towing vehicle or if the towing vehicle is being moved over rough terrain, the skid bar prevents the trailer frame from being drug across the ground or other surfaces.

Various other features of the present invention will become obvious to those skilled in the art upon reading the disclosure set forth hereinafter.

Particularly, the present invention provides a towing assembly comprising: a towbar including a member having an intermediate elongated section with opposed first and second end sections; the first end section being an elongated member extending angularly from the intermediate section in a forward direction with means thereon to connect with a towing vehicle; the second end section being an elongated member extending angularly from the intermediate section in a rearward direction and terminating in a stand means; and, releasably attaching means thereon to releasably attach to a positioning means to position the towbar in a plurality of positions, the positioning means being attached to an apparatus to be towed.

It is to be understood that the description of the examples of the present invention given hereinafter are not by way of limitation and various modificaions within the scope of the present invention will occur to those skilled in the art upon reading the disclosure set forth hereinafter.

Referring to the drawings.

Figure 1:
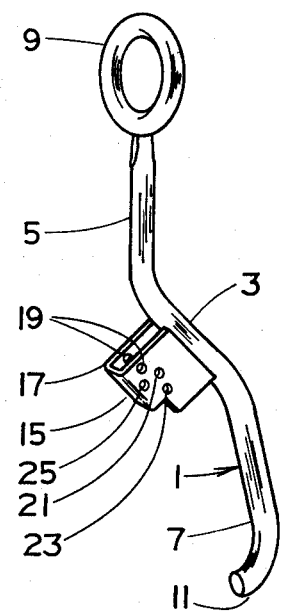
FIG. 1 is a perspective view of a towbar of the present invention.

In FIG. 1, a towbar 1 of the present invention is shown, the towbar 1 being an elongated tubular member having an intermediate section 3 and opposed end sections 5 and 7. End section 5 extends angularly from the intermediate section 3 in a forward direction and the opposed or second end section 7 extends angularly from the intermediate section 3 in a rearward direction. The first end section 5 is provided with an eyelet 9 on the end opposed to the joining of the second end section 5 with the intermediate section 3, the eyelet 9 being generally welded to the end section 5 for connecting to a towing vehicle (not shown). It is realized that other connecting means for connecting to a towing vehicle may also be utilized. The second end section 7 at its end opposed to the connection to the intermediate section 3 terminates in a lip 11 which extends angularly toward the plane including the longitudinal axis of the first end section 5. The lip 11 of the second end section 7 defines a stand means and the second end section 7 defines a skid section, the stand means and skid section to be discussed hereinafter.

Attached to the intermediate section 3 of the towbar 1 is a releasable locking device 15 which includes a bracket member of U-shaped cross-section 17 with a pluraility of aligned apertures on opposed sides of the bracket 17. The aligned apertures 19 are utilized in a manner hereinfter described for positioning the towbar in a towing position, the aligned apertures 21, hereinafter described, being utilized when the towbar 1 is extended in an operating position, and the aligned apertures 23, hereinafter described, are utilized when the vehicle to be towed is in a standing or storage position. Another pair of apertures 25 are provided in opposed legs of the U-shaped bracket 17 for receiving a bolt member 27 (FIG. 2) therethrough.

Figure 2:
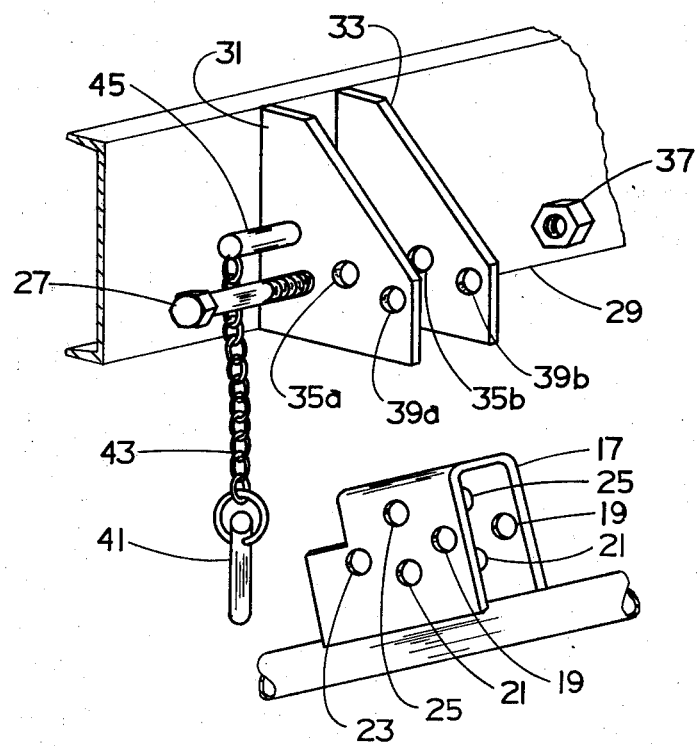
FIG. 2 is an exploded view of the releasable locking device of the towbar of FIG. 1 and a bracket assembly rigidly secured to the frame of a device to be towed.

In FIG. 2 a channel shaped frame member 29 is shown with a pair of spaced parallel plate members 31 and 33 thereon, plate members 31 and 33 receiving U-shaped bracket member 17 therebetween. Plate members 31 and 33 define a locking plate assembly and include spaced aligned apertures 35a and 35b therein for alignment with aligned apertures 25 in the U-shaped bracket 17 to receive the bolt member 27 therethrough. A nut 37 is provided to receive the bolt member 27 in threaded relation therethrough whereby bracket member 17 rotates about the axis of the bolt member 27.

A pair of spaced aligned apertures 39a and 39b are provided in plate members 31 and 33, respectively, for alignment with aligned apertures 19, 21 or 23 in the U-shaped bracket 17, depending upon the selected position desired for the towbar 1. The aligned apertures 39a and 39b receive a position locking pin 41 therethrough for maintaining the towbar in the desired position. The pin 41 is generally attached to a chain 43 which is attached to an outwardly extending stud member 45, stud member 45 being fixedly attached to one of the plate members, such as plate member 31.

Figure 3:
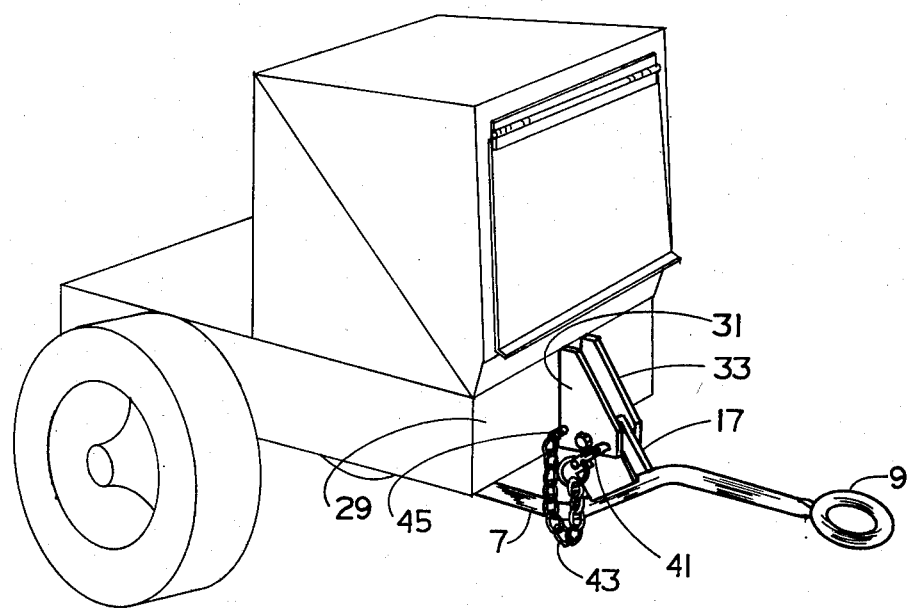
FIG. 3 is a perspective view of a towbar of FIG. 1 and a vehicle to be towed when in a towing position.

As shown in FIG. 3, the position locking pin 41 extends through aligned apertures 39a and 39b (FIG. 2) and aligned apertures 19 (FIG. 4) in the bracket 17 thereby positioning the towbar 1 in a towing position. Also, with the towbar 1 extended for a towing position, the skid section 7 is approximately parallel with the ground. In this position, the skid section 7 is directly under the center front cross frame member 29 to protect the frame work of the device being towed against accidental detachment and run away conditions, such as can happen when a single or train of, for example, five towed devices become instantly detached from the towing vehicle when the towbar 1 drops to the ground.

Figure 4:
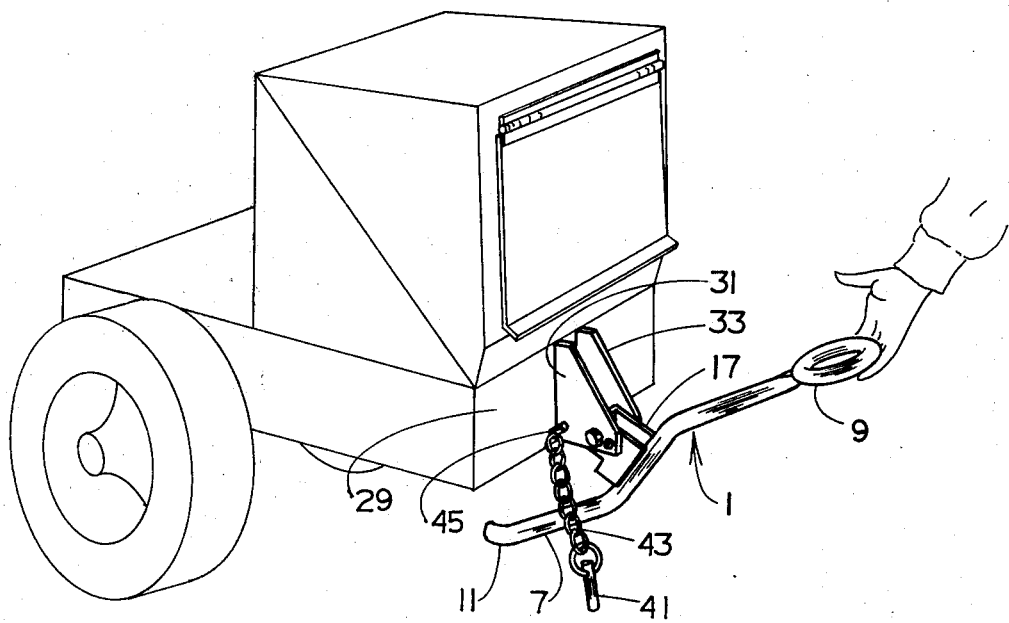
FIG. 4 is a perspective view of the vehicle to be towed and towbar of FIG. 3 showing the changing of the towbar from one position to another.

As shown in FIG. 4, the position locking pin 41 is removed from the locking plate assembly and by using the lip 11 as a fulcrum, the divice to be towed may be lifted and the towbar 1 re-positioned. As shown, a mechanical advantage of at least two to one is realized by using the aforementioned lip 11 as the fulcrum in repositioning the device to be towed.

Figure 5:
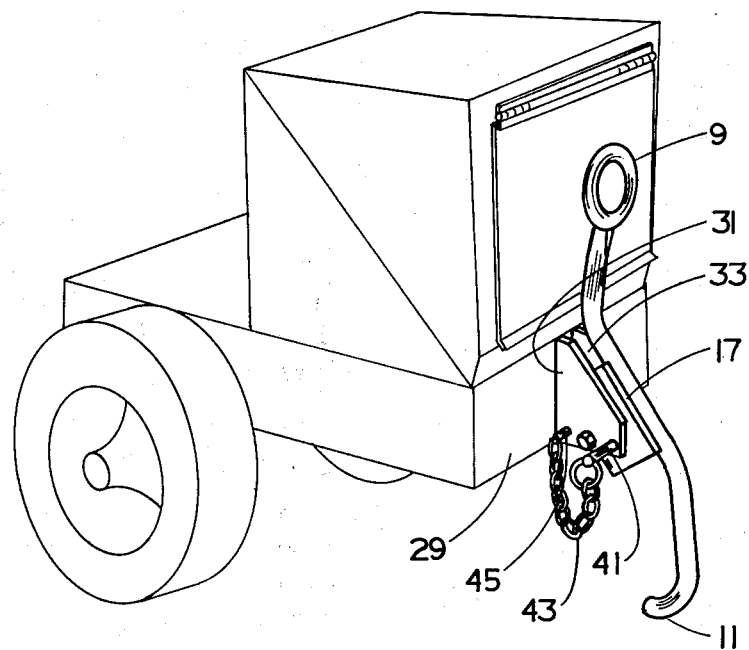
FIG. 5 is a perspective view of the device to be towed and the towbar of FIG. 3 in a storage position; and, FIG. 6 is a perspective view of the device to be towed and towbar of FIG. 3 in an operating position.

As shown in FIG. 5, the position locking pin 41 extends through aligned apertures 39a and 39b (FIG. 2) and aligned apertures 23 (FIG. 2) in the bracket 17 thereby positioning the towbar 1 in a storage or standing position.

Figure 6:
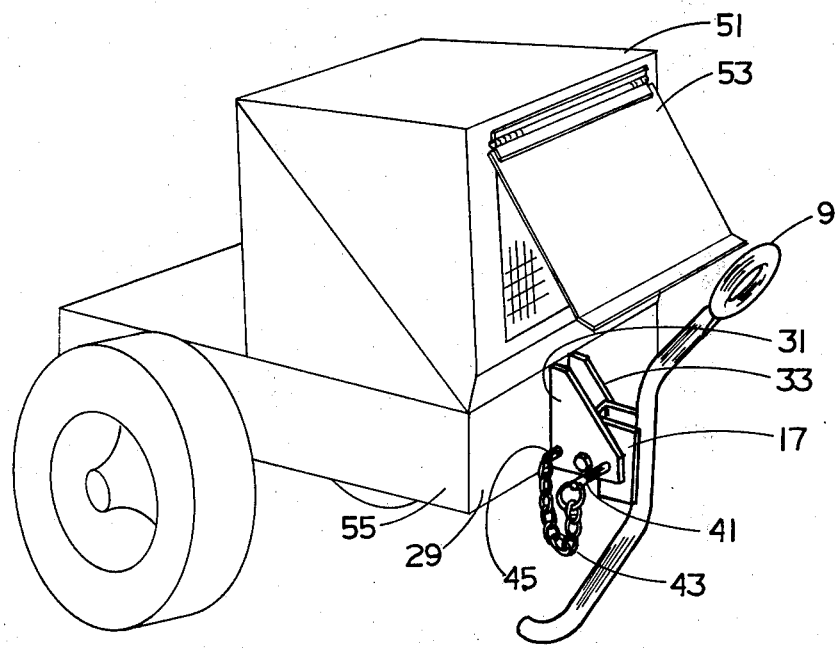

As shown in FIG. 6, the position locking pin 41 extends through aligned apertures 39a and 39b (FIG. 2) and aligned apertures 21 (FIG. 2) in the bracket 17 thereby positioning the towbar 1 in an operating position when the trailer frame includes, for example, a portable heater 51 thereon. In this example, portable heater 51 is provided with a ventilating air door 53 which is open during operation wherein the towbar 1 provides support to the trailer frame 55 at the front single support channel shaped frame member 29.

It is realized that various changes may be made to the specific embodiment shown and described without departing from the scope and principals of the present invention.

What is claimed is:

1. A towing assembly comprising: a towbar including a member having an intermediate elongated section with opposed first and second end sections; said first end section being an elongated member extending angularly from said intermediate section in a forward direction with means thereon to connect with a towing means; said second section being an elongated member extending angularly from said intermediate section in a rearward direction and terminating in a stand means; and, releasable attaching means attached to said towbar to releasably attach said towbar to a positioning means having a plurality of attaching positions, said positioning means being fixedly attached to an apparatus to be towed and pivotally mounted to said towbar attaching means.

2. The towing assembly of claim 1, said releasable attaching means including a bracket member with a plurality of apertures therein, said apertures being in alignment with opposed apertures in said positioning means receive a locking pin therethrough, each alignment position determining the position of said towbar.

3. The towing assembly of claim 2 wherein said bracket is of U-shaped cross section with spaced apertures therein in alignment with selected apertures in said positioning means.

4. The towing assembly of claim 1, said releasable attaching means being attached to said intermediate section.

5. The towing assembly of claim 1 wherein said intermediate section, said first end section, and said second end section are unitary.

6. The towing assembly of claim 5 wherein said unitary member is tubular.

7. The towing assembly of claim 1 wherein said means to connect with a towing means is an eyelet.

8. The towing assembly of claim 1 wherein the stand means is a lip which extends angularly from said second end section toward the plane including the longitudinal axis of the first end member.

9. The towing assembly of claim 1 wherein said positioning means is a pair of spaced parallel plate members with spaced aligned apertures therein in alignment with aligned apertures in said releasable attaching means, said releasable attaching means including a plurality of said aligned apertures therein at preselected positions, each preselected position being determined by the alignment with said apertures in said spaced parallel plate members.

* * * * *